United States Patent [19]

Fader

[11] 4,160,956

[45] Jul. 10, 1979

[54] NUCLEAR-PUMPED URANYL SALT LASER

[75] Inventor: Walter J. Fader, South Glastonbury, Conn.

[73] Assignee: United Technologies Corporation, Hartford, Conn.

[21] Appl. No.: 708,366

[22] Filed: Jul. 26, 1976

[51] Int. Cl.$^2$ ............................................... H01S 3/09
[52] U.S. Cl. ................................. 331/94.5 P; 176/39; 330/4.3
[58] Field of Search ...................... 331/94.5 P, 94.5 E, 331/94.5 F, 94.5 L; 330/4.3 (U.S. Only); 176/39, 46

[56] References Cited

U.S. PATENT DOCUMENTS

| 3,028,327 | 4/1962 | Weeks | 176/39 |
| 3,391,281 | 7/1968 | Eerkins | 331/94.5 P |
| 3,559,095 | 1/1971 | Nielson | 331/94.5 P |

OTHER PUBLICATIONS

Matovich, E., *Quantum Electronics*, vol. 4, 1968, p. 379.
*Laser Focus*, vol. 7, No. 4, Apr. 1971, pp. 15, 16, 18.

*Primary Examiner*—William L. Sikes
*Assistant Examiner*—Marcus S. Rasco
*Attorney, Agent, or Firm*—Prutzman, Kalb, Chilton & Alix

[57] ABSTRACT

A direct nuclear radiation pumped laser consisting essentially of a uranyl salt with a $UO_2^{++}$ uranyl ion enriched in the $U^{235}$ isotope sufficient to sustain a fission chain reaction, the uranyl ion being directly nuclear radiation pumped by a fission power transient of the core to produce laser action between a low-lying vibrational level of the first triplet electronic state and an upper vibrational level of the singlet ground state.

7 Claims, 4 Drawing Figures

NUCLEAR-PUMPED URANYL SALT LASER

SUMMARY OF THE INVENTION

The present invention and discovery relates generally to nuclear radiation excited lasers of the type described in U.S. Pat. No. 3,391,281 of J. W. Eerkens dated July 2, 1968 and entitled "Direct Nuclear Radiation Excited Photon Generator and Emitter" and more particularly to a new and improved method for producing a direct nuclear radiation excited laser pulse of extremely high energy in the visible spectrum.

In accordance with the present invention and discovery, a new and improved method is provided for producing a direct nuclear radiation excited laser pulse of extremely high energy of approximately $10^5$ to $10^6$ joules and at a wavelength in the visible spectrum of approximately 5000 Å and which is useful for example in military applications and in outer space applications in the propagation of energy an extremely long distance.

The present invention and discovery further provides a new and improved method of producing a high energy laser pulse in the visible spectrum useful in providing laser heating to an extremely high temperature for example for attaining laser-driven fusion. The present invention and discovery is useful for producing laser pulse energy in excess of the pulse energy of the order of $10^5$ joules required for creating a fusion break-even condition (i.e., a condition where the fusion output energy equals the laser input energy required to produce the necessary plasma conditions for fusion) of deuterium-tritium pellets. A net energy yield requires an input energy pulse of between $10^5$ to $10^6$ joules—an energy level capable of being produced in accordance with the present invention and discovery. The optimal wavelength for laser fusion and deuterium-tritium pellets lies in the visible spectrum as a short wavelength enhances the energy gain of the D-T pellet. In contrast, the significantly higher wavelengths of the high energy lasers currently used in laser fusion experiments, for example the wavelengths of neodymium-glass (10,000 Å) and $CO_2$ (100,000 Å), severely handicap the achievement of the desired pellet energy gain.

The present invention and discovery further provides a new and improved method of producing a direct nuclear radiation excited high energy laser pulse useful for the efficient transmission of optical beam energy.

The present invention and discovery also provides a new and improved method of producing direct nuclear radiation pumped laser beams efficiently and for an extended period of time and employing a nuclear-pumped laser system which is relatively simple and lightweight in comparison with prior systems. For example, in accordance with the present invention and discovery, a nuclear-pumped laser system could produce optical laser pulses at a repetition rate of one pulse per second and at an average power level of 100 kilowatts to 1 megawatt while consuming the nuclear fuel at the rate of only about 1 percent per year.

The present invention and discovery further provides a new and improved method of efficiently producing a direct nuclear radiation excited high energy laser pulse using either a solid or a liquid laser medium.

The present invention and discovery also provides a new and improved method of producing direct nuclear radiation pumped laser beams using a non-gaseous core composition which is a pure chemical species.

The present invention and discovery further provides a new and improved method of producing a direct nuclear radiation excited laser pulse using a core composition having a highly concentrated nuclear fission and laser medium. In accordance with the present invention and discovery, the core composition may be provided in a crystalline state to produce a direct nuclear radiation excited laser pulsed oscillator or alternatively may be provided in solution to directly amplify an applied input laser pulse.

Other benefits will be in part obvious and in part pointed out more in detail hereinafter.

A better understanding of the present invention and discovery will be obtained from the following detailed description and the accompanying drawings of illustrative applications.

DESCRIPTION OF THE PREFERRED EMBODIMENTS

Figure 1:
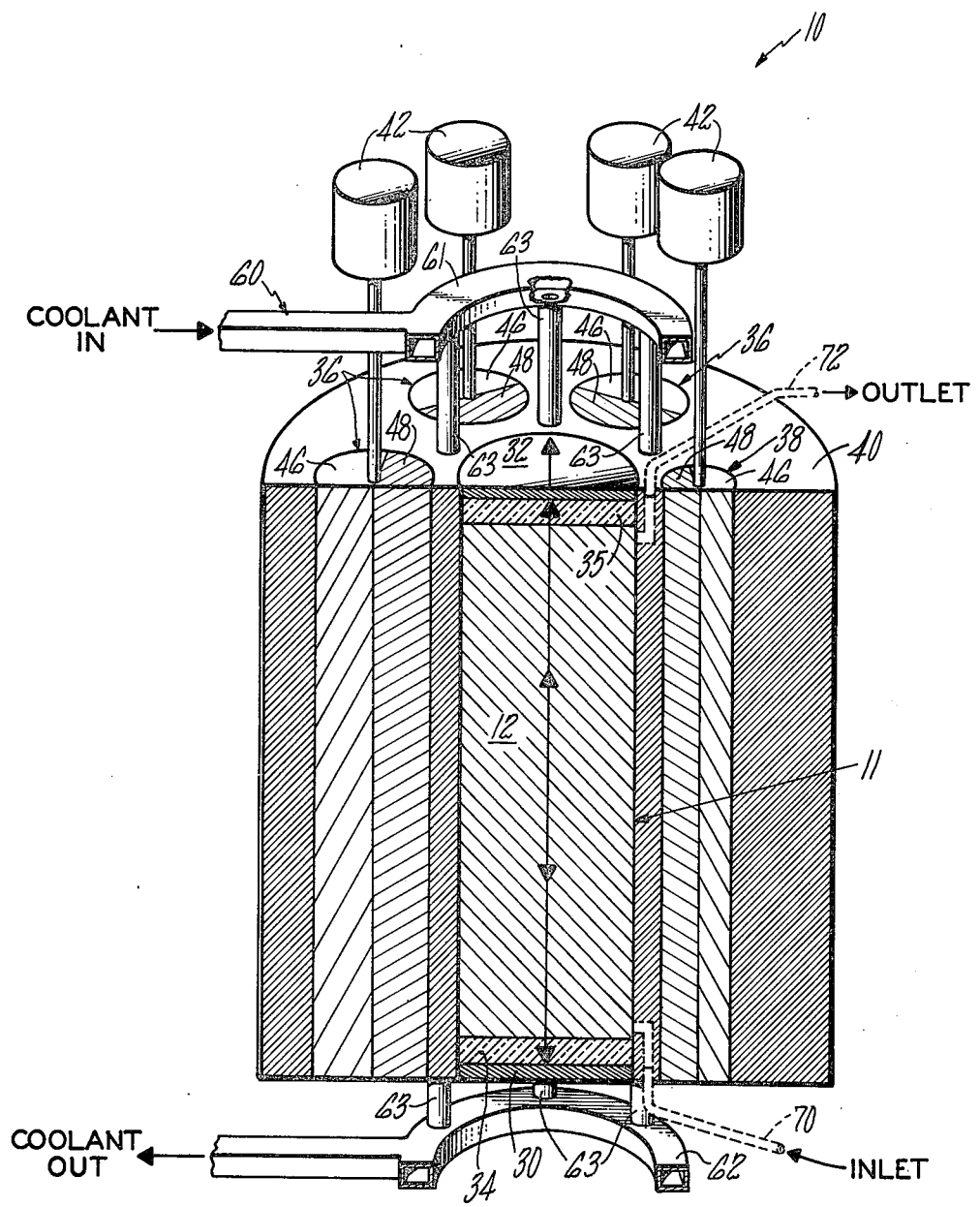
FIG. 1 is a generally diagrammatic illustration, partly broken away and partly in section, of a nuclear-pumped laser system for producing a direct nuclear radiation excited laser pulse in accordance with the present invention and discovery.

In accordance with the present invention and discovery, it has been found through mathematical analysis that a single component uranyl salt having a $UO_2^{++}$ uranyl ion enriched with $U^{235}$ can be employed to provide a direct nuclear radiation pumped laser with the $U^{235}$ providing the nuclear fission function and the $UO_2^{++}$ uranyl ion providing the laser function. Accordingly, the $U^{235}$ enriched uranyl ion $UO_2^{++}$ functions as both the light emitter and the source of fission fragments for direct radiation pumping for laser pulse generation. The mathematical analysis is set forth in the following three reports of United Technologies Research Center (UTRC), now available, and the entire subject matter of the three reports is incorporated herein by reference:

1. Title—Nuclear-Pumped Uranyl Salt Lasers
   Reference—UTRC76-50
   Author—Walter J. Fader
   Published on or about April 1976
2. Title—A Nuclear-Pumped Megajoule Laser
   Reference—UAR-N98
   Author—Walter J. Fader
   Published on or about Aug. 15, 1975
3. Title—A Megajoule Laser For Laser Fusion
   Reference—UTRC75-41
   Author—Walter J. Fader
   Published on or about Aug. 15, 1975

More specifically, it has been found that $U^{235}$ enriched uranyl salts (e.g., $UO_2(SO_4)$ or $UO_2(NO_3)_2$) may be used in the crystalline state or as a highly concentrated solute in a liquid solvent to produce a direct nuclear-pumped, high power, visible wavelength laser pulse with the $UO_2^{++}$ ions producing laser action between a low-lying vibrational level of the first triplet electronic state and an upper vibrational level of the singlet ground state having a vibrational relaxation time much shorter than the radiative lifetime of the triplet state. The fluorescence of the $UO_2^{++}$ uranyl ion is in the visible spectrum, near 5000 Å, and its radiative lifetime is about $10^{-3}$ seconds.

Of substantial significance, a direct nuclear-pumped uranyl salt laser provides: (a) a laser pulse energy of $10^5$ to $10^6$ joules; (b) a laser pulse wavelength in the visible spectrum near 5000 Å; (c) a highly concentrated fissionable energy source; and (d) a high optical energy density. This combination of physical properties is unique among lasers and makes a $UO_2^{++}$ uranyl salt laser system especially suitable for use in space and in laser-driven fusion applications. For example, since visible wavelengths are nearly optimal for the propagation of light through thin atmospheres and a vacuum, large pulses of energy could be transmitted in space in optical beams generated by the direct nuclear-pumped uranyl salt laser. Also, a large weight saving is provided in any laser package designed for this purpose since no external fuel supply is required for the laser energy. And, for example, a pulse repetition rate of one pulse per second would provide for the transmission of optical power in the range of 100 kilowatts to 1 megawatt while consuming the uranium laser fuel at the rate of only about 1 percent a year.

Other nuclear-pumped lasers have, generally, involved gases (e.g., CO, He—Xe, Ne—$N_2$) and required that the charged particles that produced the excitation of the laser gas medium be born in solid foils or films and escape into the gas. Since the loss of charged particle energy per unit mass per unit area of material traversed is essentially independent of the material, most of the particle energy is lost as useless heat in the dense foils. In contrast, in the nuclear-pumped uranyl salt laser system described here, the fissionable and lasing capabilities are provided by the same medium. Although gas mixtures that could support fission chain reactions and lasing action have been sought after, none have been shown to be operable. Even if such mixtures were available, the physical size of a gas laser system capable of energy pulses of $10^5$ to $10^6$ joules would be formidable because of the low energy density at which gas lasers must operate compared with the value of three joules per cubic centimeter typical of the uranyl salt laser described here.

A laser system for direct nuclear pumping of a laser using a uranyl salt as the nuclear fission source only was reported in *Quantum Electronics*, Volume 4, page 379 (1968) by E. Matovich of the Autonetics Division, North American Rockwell Corporation, in an article entitled "In Pursuit of a Pulsed Homogeneous Nuclear Laser". However, that laser system differed from the present laser system described herein in an essential way, namely, in that the fluorescing medium is a co-dissolved europium salt instead of the uranyl ion itself. The disadvantages of the Matovich system, not shared by the present laser system are (a) the longer wavelength (6150 Å) of the europium fluorescence make it less useful for laser fusion and space applications; (b) the large neutron absorption cross sections of europium (and other rare earths) make them reactor poisons (and europium, in particular, builds up a long chain of long-lived isotopes with large cross sections upon successive neutron absorptions); and (c) the energy efficiency of the nuclear pumping of a co-dissolved fluorescent salt is substantially limited by its solubility in the uranyl salts.

FIG. 1 illustrates an exemplary nuclear-pumped laser system 10 operable for producing a direct nuclear radiation excited laser pulse in accordance with the present invention and discovery. The laser system comprises an elongated cylindrical laser cavity 11 with a central core 12 consisting essentially of a uranyl salt of the uranyl ion $UO_2^{++}$ in the crystalline state (hydrous or anhydrous). The uranyl salt core 12 may for example consist essentially of $UO_2(SO_4)$ or $UO_2(NO_3)_2$ to provide the required $UO_2^{++}$ uranyl ion lasting medium. The uranyl salt is highly enriched in the $U^{235}$ isotope to sustain a fission chain reaction, and so that the uranyl ion also provides a fissionable medium for nuclear radiation pumping of the uranyl ion with the $U^{235}$ enriched uranyl salt nuclear fuel.

Suitable laser mirrors 30, 32 are mounted at opposite ends of the laser cavity 11, and in a known manner one of the mirrors 30 may be totally reflective and the other mirror 32 may be only partially reflective and be accurately adjusted to be aligned parallel to the fully reflective mirror 30. Suitable glass spacer shields or plugs 34, 35 ae mounted between the core 12 and the laser mirrors 30, 32 and the laser mirrors 30, 32 are suitably designed and mounted relative to the core 12 in accordance with the laser beam wavelength for producing a laser pulse in a known manner, the laser pulse being extracted or transmitted axially from the elongated cylindrical laser cavity 11 as shown by an arrow in FIG. 1.

The elongated cylindrical laser cavity 11 is surrounded by an annular arrangement of five elongated rotary control drums 36 and a rotary transient drum 38 mounted within a suitable neutron reflector jacket 40. The control and transient drums 36, 38 are angularly spaced around the elongated cylindrical laser cavity 11 with their axes parallel to the longitudinal axis of the cavity 11 and extend axially beyond the central core 12 to the ends of the reflector jacket 40. The drums 36, 38 are adapted to be individually rotated by suitable respective drive mechanisms 42. Each drum 36, 38 has two opposed semi-cylindrical sectors 46, 48 of a neutron reflective substance (e.g. Be) and a neutron absorber or "poison" substance (e.g. $B_4C$) respectively.

The crystalline uranyl salt core 12 is initially cooled for example by liquid nitrogen below a maximum of approximately 100° K and preferably to the liquid nitrogen temperature of 77° K. For that purpose, a liquid nitrogen cooling system 60 having inlet and outlet manifolds 61, 62 and axially extending conduits 63 extending through the neutron reflector jacket 40 is provided for conducting liquid nitrogen coolant through the jacket 40 surrounding the core 12. The start-up procedure comprises rotating the control drums 36 away from their reactor shutdown positions shown in FIG. 1 to rotate their semi-cylindrical neutron absorber sectors 48 away from the reactor core 12 and rotate their semi-cylindrical neutron reflective sectors 46 toward the core 12 to thereby raise the reactivity of the core 12 to a delayed-critical condition. The transient drum 38 is then rapidly rotated from its normal position shown in FIG. 1 to rotate its semi-cylindrical absorber sector 48 away from the core 12 and rotate its neutron reflective sector 46 to face the core 12 to drive the reactor core to above prompt-critical.

As the resulting fission power and core temperature exponentiate with an e-folding time of about a millisecond, the upper lasing level is populated by charged particle collisions with the uranyl ions to the threshold value and lasing commences spontaneously. Thermal expansion of the reactor core 12 due the temperature rise accompanying the power transient reduces the reactivity to a point between prompt and delayed critical to cut off the laser power and fission power transient. The reactivity is then further reduced by rotating the neutron absorber sectors 48 of the control and transient drums 36, 38 to face the reactor core 12 to completely shut down the reactor. The liquid nitrogen coolant is then conducted through the cooling system 60 for cooling the core 12 to reduce its temperature to its initial value of 77° K. and thereby condition the laser to be pulsed again.

It can be seen that the laser volume and the volume in which the fission chain reaction takes place are the same since the lasing medium is the $UO_2^{++}$ ion of the $U^{235}$ enriched uranyl salt. The lasing transition is a fluorescence line of the uranyl ion near 5000 Å. During the fission power transient, the lasing medium is subjected to intense fluxes of fission fragments, recoil nuclei, electrons from fast beta decay, gamma radiation and secondary electrons. All of these radiations cause ionization and excitation of the uranyl ion, but ninety percent of the fission energy is initially carried off by fission fragments, each with about 90 MeV. The fragments lose this energy by ionization and excitation of molecules of the medium over their 10 micron to 20 micron stopping distances. The energies of the secondary electrons, about 1 keV, are dissipated in further ionization and excitation.

The uranyl salt laser is essentially a two-level system. The upper lasting level is directly excited and is populated also by relaxation of higher excited states. The upper level is the $v'=0$ vibrational level of the first or lowest triplet electronic state of the $UO_2^{++}$ uranyl ion and has a radiative lifetime (approximately $10^{-3}$ sec) much longer than the vibrational relaxation time of the lower level. The lower lasing level is an excited ($v''\neq 0$) vibrational level of the singlet ground state of the $UO_2^{++}$ uranyl ion. The population inversion is the result, chiefly, of a difference in multiplicity of the two lasing levels.

The total populations of these levels in the laser volume is designated $N_2$ and $N_1$ in the following analysis. The threshold value of the upper level population $N_{2th}$ and fission pumping power $P_{th}$ are the minimum values of these quantities for which lasing can occur. At the liquid nitrogen temperature of 77° K., the lower level population $N_1$ may be neglected, the line width $\Delta f$ is small and the lifetime t of the upper lasing level is nearly the radiative lifetime $t_R$, all of such conditions being favorable to the achievement of a low lasing threshold. $N_{2th}$ is then calculated on the basis that the rate of gain (by stimulated emission) of resonant photons in the laser cavity mode balances the photon loss rate by absorption and leakage from the laser volume as follows:

$$N_{2th} = 1/Kt_c$$

Here $t_c$ is the cavity lifetime of a resonant photon, defined in terms of the absorption coefficient $a_o$, the refractive index $n_o$, the length L of the laser cavity and the mirror reflectivities $R_1$ and $R_2$, as calculated as follows:

$$t_c^{-1} = \frac{2a_o c}{n_o} - \frac{c}{2n_o L} \cdot Log_e R_1 R_2$$

The cavity mode coupling coefficient K is the radiative transition probability ($1/t_{21}$) divided by p, the number of optical modes in the laser volume with resonant frequencies within the frequency width of the lasing line. For a wavelength $\lambda$ and laser volume V, the coupling coefficient K is calculated as follows:

$$K = \frac{1}{pt_{21}} \approx \frac{\lambda^3}{8\pi n_o^3 V} \cdot \frac{f}{\Delta f} \cdot \frac{1}{t_{21}}$$

The threshold pumping power is calculated by equating the rate of pumping of the upper lasing level to the rate of decay of the upper level population at threshold:

$$P_{th} = \frac{eN_{2th}}{\gamma t} = \frac{e}{\gamma t} \cdot \frac{1}{Kt_c}$$

Here e is the energy of the lasing transition, $\gamma$ is the efficiency of the pumping of the upper level and t is the lifetime of the upper level. The threshold fission power density for lasing is, therefore $$\frac{P_{th}}{V} = \frac{e}{\gamma t} \cdot 8\pi\left(\frac{n_o^3}{\lambda}\right)\frac{\Delta f}{f} t_{21}\left(\frac{2a_o c}{n_o} - \frac{c}{n_o L} \ln R_1 R_2\right)$$

Estimates of the values of the parameters used in these formulas are listed in the following Table I for the nuclear-pumped crystalline uranyl salt laser described.

TABLE I

| Optical Parameters of Uranyl Salt at 20° K. and 77° K. | | |
| --- | --- | --- |
| Photon Energy | e | = 2.43 eV = $3.9 \times 10^{-19}$ joule |
| Wavelength | $\lambda$ | = $5.09 \times 10^{-5}$ cm |
| Frequency | f | = $6.0 \times 10^{14}$ sec$^{-1}$ |
| Absorption Coeff. | $a_o$ | = $10^{-3}$ cm$^{-1}$ |
| Refractive Index | $n_o$ | = 1.33 |
| Pumping Efficiency | $\gamma$ | = (0.5) × (0.2) × (0.33) = .033 |
| Radiative Lifetime | $t_{21}$ | = $4.0 \times 10^{-3}$ sec |

| | T = 20° K. | T = 77° K. |
| --- | --- | --- |
| Line Width $\Delta f$ | = $4.8 \times 10^{10}$ sec$^{-1}$ | $3.0 \times 10^{11}$ sec$^{-1}$ |
| Decay Time t | = $1.45 \times 10^{-3}$ sec | $1.13 \times 10^{-3}$ sec |

The efficiency, $\gamma$, was calculated on the basis that (1) half of the initial energy of the fission fragments is converted to excitation of the molecules and ions of the laser medium; (2) the excitation energy is distributed among the chemical species of the medium in proportion to their concentrations; and (3) the excitation of each uranyl ion to the upper lasing level requires three times the excitation energy of the ion at its upper lasing level. The relative concentration factor of 0.2 used in the estimation of $\gamma$ in the table is typical of hydrated uranyl salt crystals. Substitution of the parameter values from Table I into the formula for $P_{th}/V$ gives threshold power densities of $1.45 \times 10^2$ watts/cm$^3$ at 20° K. and $1.17 \times 10^3$ watts/cm$^3$ at 77° K. for L=100 cm and $R_1 R_2 = 0.5$. Most of this power is dissipated as heat. The useful pumping power densities at threshold, obtained by multiplying the foregoing threshold power densities by $\gamma$, are 5 watts/cm$^3$ at 20° K. and 39 watts/cm$^3$ at 77° K. Most of the difference in the threshold power at the two temperature levels results from the increase in line width $\Delta f$ with temperature. The rest is accounted for by the decrease in the lifetime of the upper level with increasing temperature.

Figure 2:
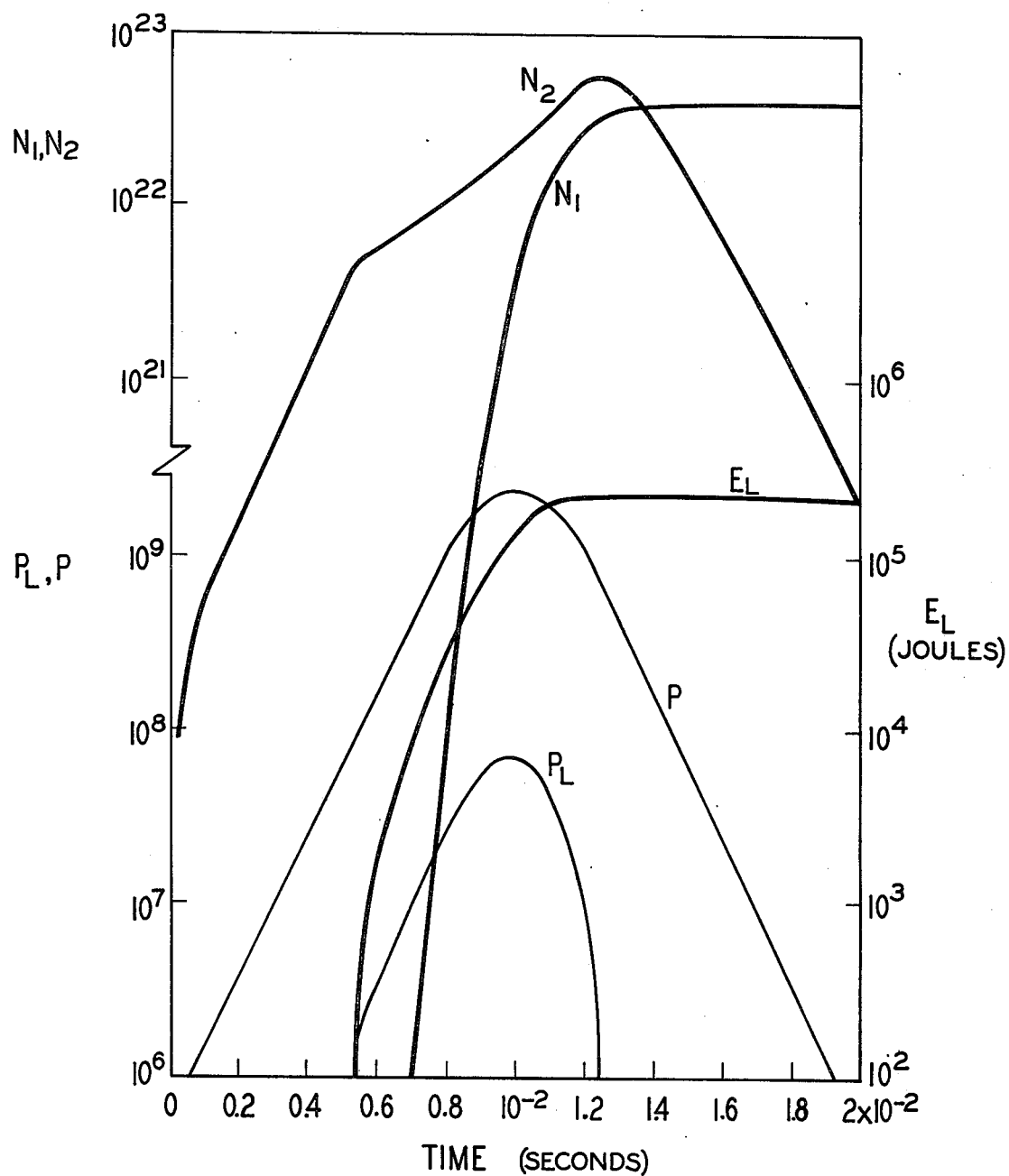
FIG. 2 is a graph representation of calculated laser level populations and output versus time provided by a typical 100 liter volume nuclear-pumped uranyl salt laser of the present invention.

At higher temperatures, the population $N_1$ of the lower lasing level, being always close to its equilibrium value, is no longer negligible and increases with temperature. In the calculation of the time-dependence of the laser action, the heating of the laser medium must be taken into account. Results of a typical calculation based on an assumed conventional behavior of the low-temperature specific heat are shown in FIG. 2. In this calculation, the laser volume was cylindrical with a 20 cm radius and a 100 cm length, and contained a total of $4.24 \times 10^{26}$ uranyl ions. The total population of the upper lasing level $N_2$ is initially proportional to the fission power P(t) increasing nearly exponentially until it reaches the threshold value $P_{th}$ at about 5 milliseconds. At the onset of lasing, the laser power $P_1(t)$ becomes proportional to the fission power, the ratio of the two being nearly equal to the efficiency $\gamma$. Between 5 and 10 milliseconds $N_2$, always close to the instantaneous threshold value, increases with the temperature broadening of the line width $\Delta f$. After 10 milliseconds, the temperature is high enough for an appreciable equilibrium population $N_1$ of the lower lasing level. After 12 milliseconds, the population inversion, $N_2-N_1$, drops below the threshold value and the laser power is abruptly cut-off. The total energy of the laser pulse $E_L$ is calculated to be 0.24 megajoule, about 2.5 percent of the fission energy. The final value of the laser temperature is 139° K., only 4° K. higher than the temperature at the time of cut-off. For the same fission pulse, but for an initial temperature of 77° K., the calculated laser pulse energy is only slightly smaller, 0.20 megajoule. The energy difference is lost early in the pumping pulse and is the result of the larger value of $\Delta f$ and higher lasing threshold at 77° K.

Figure 3:
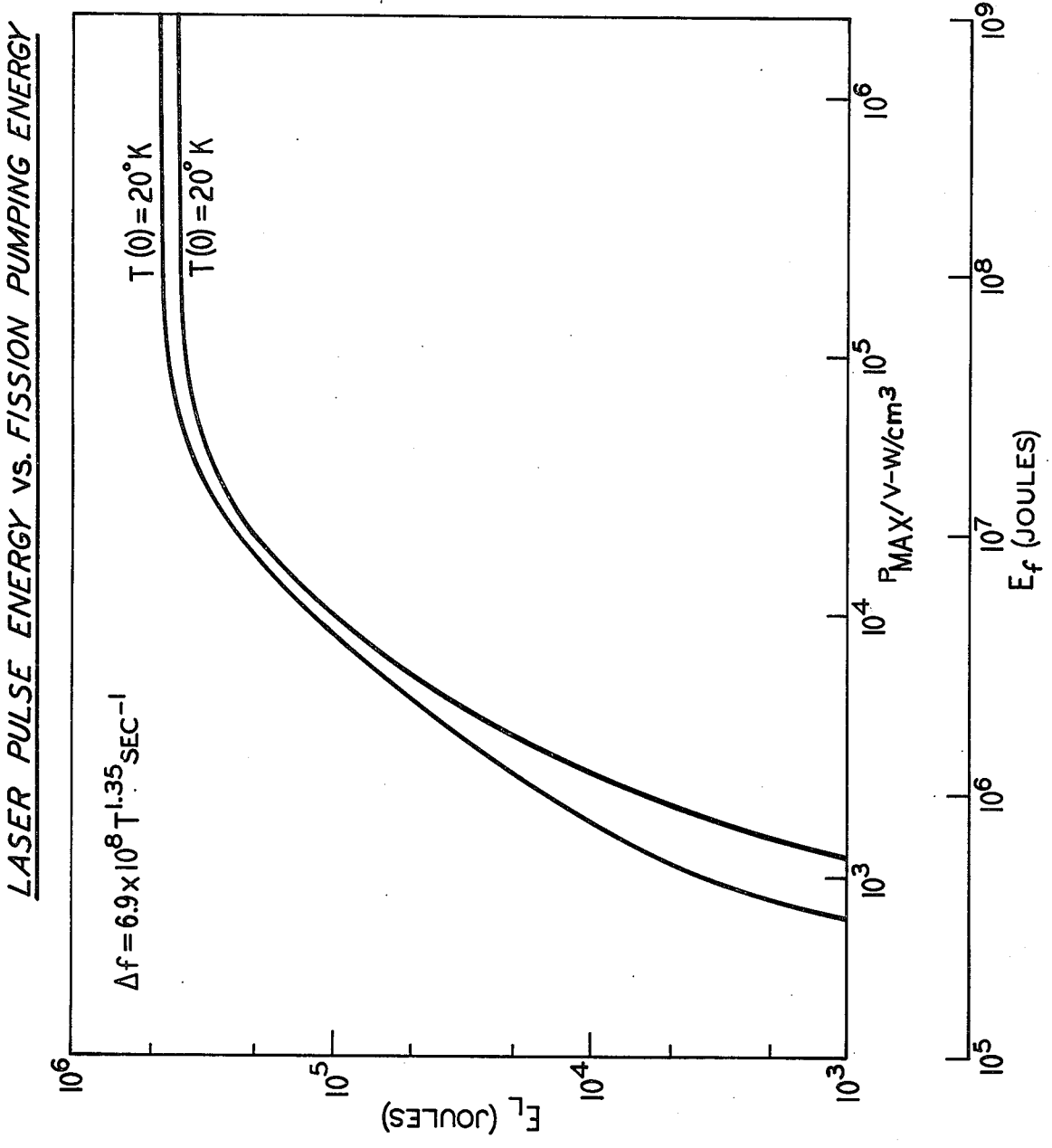
FIG. 3 is a graph representation of calculated laser pulse energy versus fission pumping energy provided by the nuclear-pumped uranyl salt laser.

Calculated values of laser pulse energies $E_L$ are plotted versus fission energy $E_f$ in FIG. 3, for initial temperatures of 20° K. and 77° K. Corresponding values of maximum fission power density $P_{max}/V$ are indicated on the horizontal axis. Both curves exhibit threshold behavior at low energies. The 20° K. curve tends toward $E_L=0$ near $P_{max}/V=7\times10^2$ watts/cm$^3$, while the threshold for the 77° K. curve lies above $1.2\times10^3$ watts/cm$^3$. The latter value is in agreement with the earlier estimate of $P_{th}/V=1.17\times10^3$ watts/cm$^3$ for 77° K. The 20° K. threshold is significantly larger than the corresponding earlier estimate of $1.45\times10^2$ watts/cm$^3$ because the heat capacity at 20° K. is small and when $N_2$ has attained its threshold value, the temperature has been raised from 20° K. to about 70° K. In the range of fission energies $E_f=4$ MJ to 10 MJ, the laser pulse energy $E_L$ is proportional to $E_f$ and the efficiency is about 2.5 percent. At higher energies, $E_L$ levels off and is nearly constant above $E_f=40$ MJ. Lasing action is quenched by the thermal effects of line broadening, of increased population of the lower lasing level and of enhancement of nonradiative transitions from the upper level. Lasing in the $v'=0$ to $v''=1$ transition ceases at a temperature of about 180° K. and any additional fission energy generated serves only to raise the temperature further.

A uranyl salt solution would have advantages over the crystalline uranyl salt laser described above in that products of radiation damage could be separated from the solution and the laser material could be circulated and cooled through a heat exchanger outside the laser cavity.

A nuclear-pumped laser of the type diagrammatically shown in FIG. 1 could be used with a liquid uranyl salt solution (e.g., aqueous or other suitable solution in which a highly concentrated uranyl salt solute is dissolved) by providing suitable inlet and outlet conduits 70, 72 for periodically charging the laser cavity with the uranyl salt solution either by employing an intermittent flow or a continuous flow through the laser cavity at the desired rate. Also, where the uranyl salt solution is used for laser amplification as hereinafter described, the excited uranyl salt mass may be rapidly pumped from the reactor to a separate cavity for laser amplification, or such amplification may be effected with the excited uranyl salt mass in the reactor, in which event, the laser mirrors 30, 32 may or may not be employed.

Some disadvantages resulting from the use of a liquid uranyl salt solution rather than uranyl salt in the solid state are the increased fluorescence line width, the reduced concentration of uranyl ions, the increased thermal population of the lower lasing level and the higher nonradiative transition probabilities. All of these differences tend to raise the value of the fission pumping power threshold for lasing. However, in comparison with gases or other laser solutions, a concentrated uranyl salt solution is significantly superior in that the $UO_2^{++}$ ions can be highly concentrated due to the practically unlimited solubility of $UO_2^{++}$ uranyl salts and whereby higher nuclear pumping efficiency and higher laser pulse energies are obtainable.

Figure 4:
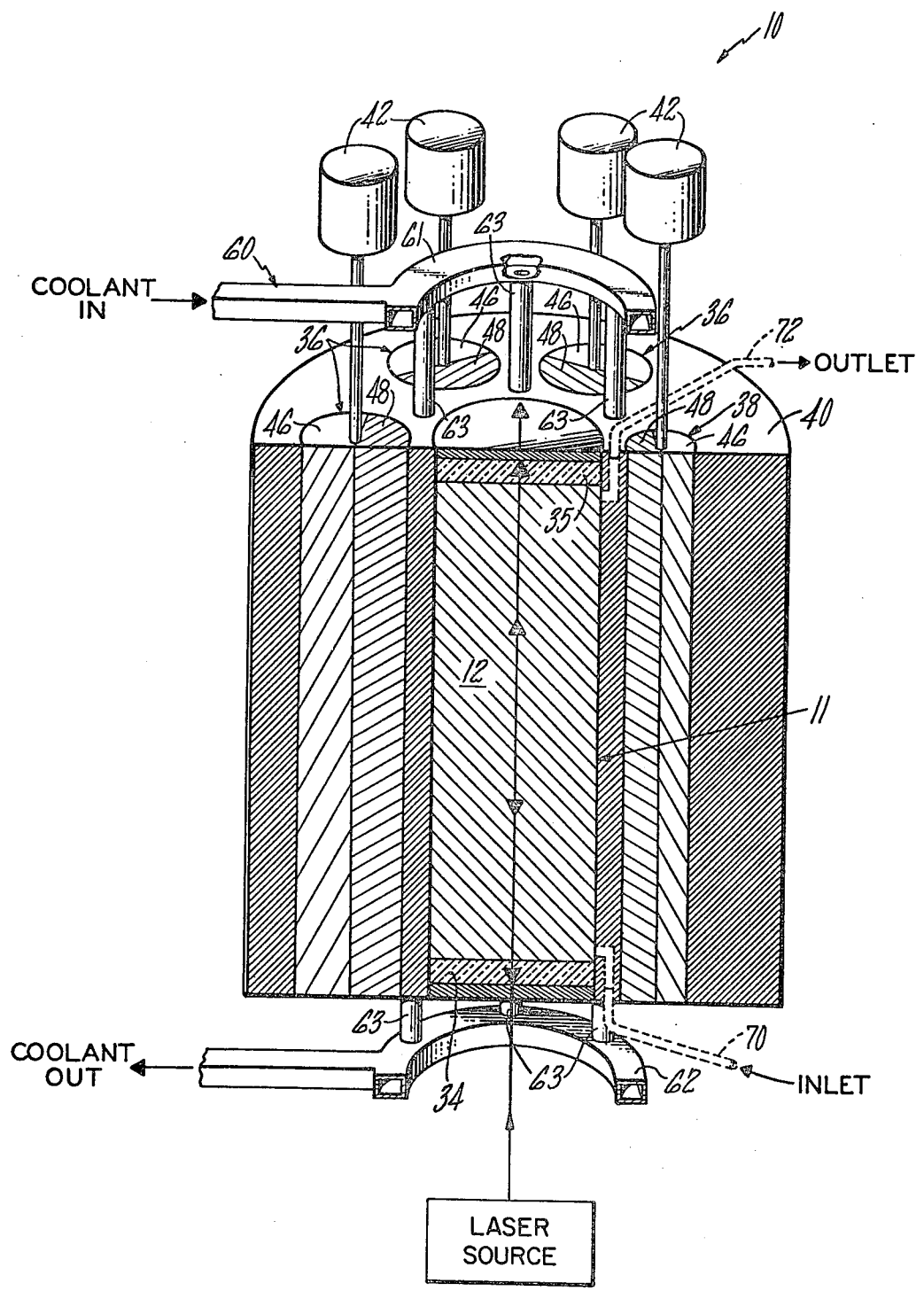
FIG. 4 is a generally diagrammatic illustration, partly broken away and partly in section, of a nuclear-pumped laser system for producing a nuclear radiation excited laser pulse through amplification of an incoming laser pulse in accordance with another embodiment of the present invention and discovery.

The fluorescence line widths of room temperature uranyl salt solutions are 500 to 1000 cm$^{-1}$ and nonradiative transitions reduce the lifetime of the triplet state to about one-tenth of the radiative lifetime. These two parameters, by themselves, raise the pumping power threshold for lasing by a factor of about $10^3$ over the value for the low temperature uranyl crystalline salt. Still, the energy storage time of $10^{-4}$ seconds, essentially the nonradiative decay time of the triplet state, is effectively infinite if the population inversion is to be used to amplify a nanosecond pulse from a dye laser tuned to the center of a uranyl fluorescence line (for example employing a laser system as shown in FIG. 4). The amplified pulse will have a line width (approximately 1 Å) and pulse width characteristic of the input laser pulse width.

The operating wavelength of the laser amplifier must correspond to a transition to the vibrational level $v''=2$ (5330 Å) or $v''=3$ (5580 Å) of the ground state, since the $v''=1$ level is too highly populated at room temperature. The amplifier gain will be limited by the permissible temperature rise of the solution during the fission pulse. An energy density of $10^2$ joules/cm$^3$ will cause a 25° C. rise in temperature but, at a pumping efficiency of 3 percent, will raise the density of triplet state uranyl ions to $n_2=10^{19}$ cm$^{-3}$. Upon substitution of the parameters of Table II into the expression for the gain per unit length, $$G = \frac{3}{8\pi^2} \frac{N_2}{V} \frac{\lambda^2}{n_o^2 \Delta f \, t_R} \text{ cm}^{-1}$$

the value of G is estimated as 1 percent per cm. These results suggest that a fission-pumped uranyl salt solution (aqueous or other liquid solution at for example 20° C.) could serve as a high-gain amplifier in which nanosecond pulses are amplified to energies of about $10^5$ joules in a volume of 100 liters.

TABLE II

| Wavelength | $\lambda$ | $= 5.5 \times 10^{-5}$ cm |
|---|---|---|
| Refractive Index | $n_o$ | $= 1.5$ |
| Radiative Lifetime | $t_R$ | $= 10^{-3}$ sec |
| Line Width | $\Delta f$ | $= 2.4 \times 10^{13}$ sec$^{-1}$ |

As will be apparent to persons skilled in the art, various modifications, adaptations and variations of the foregoing specific disclosure can be made without departing from the teachings of the present invention.

I claim:

1. In a method of producing a high intensity laser beam with nuclear radiation pumping using a combined lasing and fissionable composition capable of lasing and sustaining a fission chain reaction, comprising the steps of establishing a prompt critical fission power transient condition of a predetermined mass of said composition creating a fission chain reaction operative to pump the composition to its lasing threshold power level by direct excitation thereof with the products of the nuclear fission chain reaction and secondary electrons, and producing a high intensity laser beam with the excited composition, the improvement wherein the method comprises providing a combined lasing and fissionable composition consisting essentially of a uranyl salt with a uranyl ion $UO_2^{++}$ enriched in the $U^{235}$ isotope sufficient to sustain a fission chain reaction and with the uranyl ion providing a lasing medium and wherein, as a result of establishing said prompt critical fission power transient of a predetermined mass of said combined lasing and fissionable composition, the uranyl ion is pumped by the direct excitation thereof with the products of the nuclear chain reaction and secondary electrons to provide a lasing transition between a low-lying vibrational level of the first triplet electronic state and an upper vibrational level of the singlet ground state of the uranyl ion.

2. A method of producing a high intensity laser beam in accordance with claim 1 wherein the method comprises providing the uranyl salt in its crystalline state and cooling the uranyl salt to a temperature of less then 100° K. prior to establishing said prompt critical fission power transient condition to create the fission chain reaction.

3. A method of producing a high intensity laser beam in accordance with claim 1 comprising producing the laser beam by applying an input laser beam to the excited lasing medium which is tuned to the wavelength of the uranyl salt transition and amplifying the input laser beam with the excited lasing medium.

4. A method of producing a high intensity laser beam in accordance with claim 3 wherein the uranyl salt is a highly concentrated solute in a liquid solvent medium.

5. A nuclear-pumped laser comprising an elongated laser cavity with a core of a combined lasing and fissionable composition consisting essentially of a uranyl salt with a $UO_2^{++}$ uranyl ion enriched in the $U^{235}$ isotope sufficient to sustain a fission chain reaction, the uranyl ion providing a lasing medium adapted to be nuclear radiation pumped by the direct excitation thereof with the products of a fission chain reaction and secondary electrons of the core to provide a lasing transition between a low-lying vibrational level of the first triplet electronic state and an upper vibrational level of the singlet ground state of the uranyl ion; longitudinally spaced parallel reflecting mirror means, fully and partially reflective respectively, at opposite longitudinal ends of the laser cavity for extracting a longitudinally transmitted laser pulse from the core, and fission control means encircling the core selectively operable for causing an above-prompt critical power transient of the core for nuclear radiation pumping of the uranyl ion for generating a laser pulse.

6. A nuclear-pumped laser according to claim 5 wherein the uranyl salt is in its crystalline state.

7. A nuclear-pumped laser according to claim 5 wherein the uranyl salt is a highly concentrated solute in a liquid solvent.

* * * * *